Figure 1:
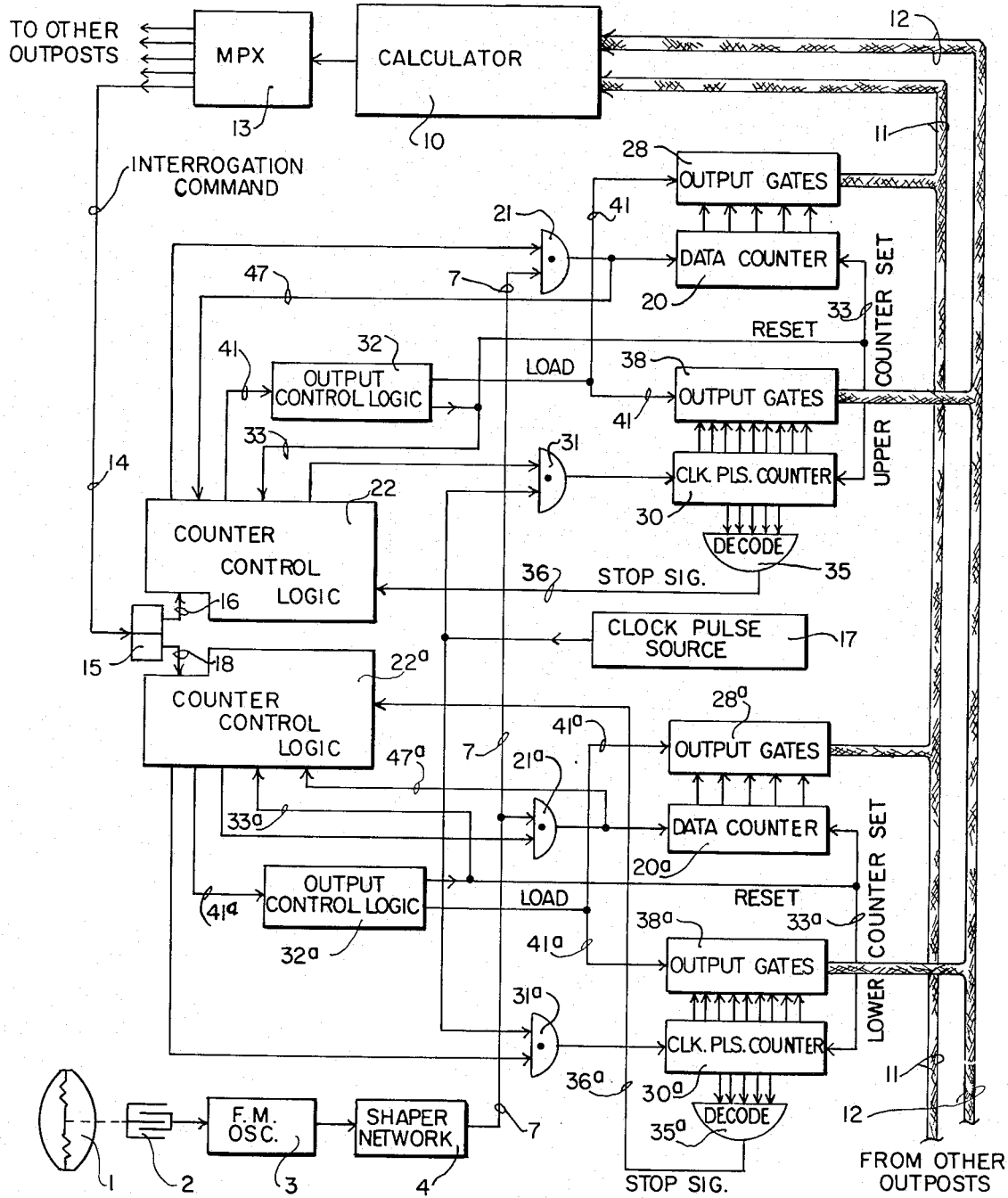

United States Patent [19]
Trott, Jr. et al.

[11] 3,909,599

[45] Sept. 30, 1975

[54] DIGITAL FM DISCRIMINATOR

[75] Inventors: Wayne B. Trott, Jr., Garland; Robert F. Brown, Jr., Dallas, both of Tex.

[73] Assignee: Teledyne Industries, Inc., Dallas, Tex.

[22] Filed: Nov. 23, 1973

[21] Appl. No.: 418,233

[52] U.S. Cl. ......... 235/151.3; 324/78 D; 324/79 D; 325/349; 328/140; 329/129
[51] Int. Cl. .................... G01r 23/02; G06f 15/20
[58] Field of Search ...... 235/150.3, 151.3; 325/349; 324/78 D, 79 D; 328/140; 329/104, 126, 129, 140

[56] References Cited
UNITED STATES PATENTS

| | | | |
|---|---|---|---|
| 3,548,328 | 12/1970 | Breikss | 329/126 |
| 3,553,728 | 1/1971 | Frank et al. | 324/78 D |
| 3,745,475 | 7/1973 | Turner | 324/79 D |
| 3,766,472 | 10/1973 | Whitney | 324/78 D |
| 3,803,486 | 4/1974 | Russell et al. | 324/78 D |

*Primary Examiner*—Malcolm A. Morrison
*Assistant Examiner*—Jerry Smith
*Attorney, Agent, or Firm*—Dowell and Dowell

[57] ABSTRACT

A discriminator for converting a frequency modulated signal into a digital representation whose magnitude changes with the frequency of the signal, wherein the FM signal is periodically sampled and converted with an accuracy of resolution that exceeds the resolution obtainable merely by counting FM cycles for a fixed time interval, first by varying the boundaries of the counting interval window sufficiently that it always begins and ends at a predetermined point on the FM waveform so that an integral number of cycle are counted, and second by using several identical sets of counters operating during different series of counting window cycles that are mutually staggered and overlapping in real time thereby to permit each counting window to be longer in real time than the intervals between which the output counts of the discriminator are to be sampled.

5 Claims, 3 Drawing Figures

DIGITAL FM DISCRIMINATOR

The invention herein described was made in the course of or under a contract, or subcontract thereunder, with the United States Air Force.

FIELD OF THE INVENTION

This invention relates to frequency modulation (FM) signal discriminators, and more particularly to discriminators operative to receive an FM signal whose frequency represents recoverable intelligence and to convert the signal into a representation in the form of a digital signal whose magnitude corresponds with the frequency of the signal averaged over the duration of the time window during which it was sampled.

BACKGROUND AND PRIOR ART

The present system is particularly useful in connection with instruments seeking to provide highly accurate measurements of parameters which vary so randomly that the frequency of the FM signal can change over a wide range within the duration of a sampling window. For instance, the velocity of fluids is often measured by measuring differential pressure using a diaphragm transducer which is displaced by the differential pressure, the diaphragm of the transducer being coupled to move a capacitive or inductive component in an oscillator circuit whose frequency then represents the differential pressure being measured. It has been the usual practice to detect the frequency modulation component, filter out the carrier and further filter the modulation with anti-aliasing circuitry, and then to perform an analog-to-digital conversion on the resulting analog signal.

For reasons hereinafter discussed it is desirable to convert the FM signal representing the measured parameter, whether differential pressure or some other measured variable, directly into a digital representation without detecting the FM, without anti-aliasing filtering and without A/D conversion. The prior art teaches means for accomplishing this general purpose, for instance, by counting clock pulses for one cycle of the FM signal or one half cycle thereof, but these teachings provide rather inaccurate conversions, especially in view of the difficulty in determining the exact moments of the zero-axis crossings of the FM signal which moments determine the time window during which clock pulses are counted. Systems of this general type are shown in U.S. Pat. Nos. 2,950,471 to Hoeppner, 3,548,328 to Breikss, 3,600,680 to Maniere, 3,663,885 to Stewart, or 3,670,250 to Fritkin. The present invention differs from these teachings, inter alia, in that the length of each counting window is very much longer than one FM cycle, and that the window's length is somewhat variable and is cooperatively determined both by making it begin and end at a zero-axis crossing of the FM signal and by having its length also determined by counting a large number of clock pulses which are separately counted. After completion of the count a calculator means is used to calculate a digital representation having very high resolution.

THE INVENTION AND ITS OBJECTS

It is common practice to measure parameters in the field, to convert the measurements to digital form and to deliver the digital representations thereof to a central processing unit which often includes calculator or computer means programmed or hard-wired to calculate from these parameters the ultimately desired information and then store it, for instance, when calculating wind velocity from differential pressure measurements, or net gas flow in a pipeline from differential pressure, temperature and pressure measurements made in the vicinity of an orifice, etc. The present system is especially applicable to the measuring with great accuracy of parameters which vary only quite slowly, using transducers whose motions have been very accurately calibrated so that the FM signal variations closely follow the parameter variations. Sometimes, a profile of the transducer calibration is entered in the computer which then automatically corrects the incoming data from that particular transducer accordingly.

It is the principal object of this invention to provide a system for converting such an FM data signal into a digital representation with great accuracy of resolution. This purpose is aided by recognizing and using to advantage the fact that the FM signal frequency can be counted for the duration of a counting window which is of long real-time duration. On the other hand, since the present discriminator is mainly intended for use cooperatively with programmed data acquisition and calculating systems which interrogate the discriminator for new data at regular sampling intervals, the duration of the counting window would seem to be limited by the time between sampling interrogations.

It is another major object of the present invention to provide a discriminator in which the counting windows can be made of greater duration than the interval of time between sampling interrogations. One of the basic factors which limits the resolution achieveable when converting the FM signal to a digital representation is the one-count ambiguity which can occur at the beginning and at the end of the counting window. Since its magnitude as compared with the total number of counts made during the window can be significant for any window of given duration, the counting resolution can be improved by raising the center frequency of the incoming FM signal representing the measured parameter. However, this has its limits, and in the present instance, 50 KHz was found to be about the upper limit useable for the center frequency considering circuit linearity and stability. Another way to improve resolution is to increase the duration of the counting window. However, as pointed out above the calculator interrogates the present discriminator at a fixed sampling rate, in the practical embodiment once every 250 milliseconds, and this appears to limit the useable real-time window duration. This apparent limitation has been eliminated by providing a discriminator having control logic which establishes multiple staggered and overlapping series of counting cycles each having separate counter means which are then interrogated sequentially such that the counter means for one of the cycles are enabled to load their contents into the calculator means every 250 M sec, but each counter means outputs less often and therefore its counting window can be longer than 250 M sec.

A further major object of the invention is to provide a system in which, for every counting cycle series there are two counters, one counting data pulses representing the zero-axis crossings of the FM signal, nominally occurring at the rate of 50 KHz, and the other counter counting clock pulses from a clock source of much higher frequency, i.e., in the megahertz range. In the practical embodiment of the invention there are two staggered and overlapping series of counting cycles each having a data counter and a clock pulse counter, and the latter pulses occur at a 4 MHz rate, whereby a one-count ambiguity amounts only to one part in about two million clock pulses counted, which is well within the 100 db dynamic range being sought. As stated above, excellent resolution of conversion from FM to digital form is achieved by using a window of variable length, whose length is determined cooperatively using both the data pulses and the clock pulses. In the present example where the computer sampling interval is 250 M sec and where two staggered overlapping counting cycles are used in the discriminator, each pair of data and clock pulse counters can count for a window which is almost twice that interval, about 497 M sec having been selected. For the purpose of determining when 497 milliseconds of the window has transpired, each clock pulse counter is provided with a decoder gate wired to output a window STOP pulse when the count is equivalent to 497 M sec, indicating the approach of the end of the window. The window was started by the occurrence of an interrogation pulse from the calculator serving as a window start pulse. However, the window is neither started nor stopped by these pulses, not until the occurrence of the next data pulse. As a consequence of the cooperation of a data pulse being required either to start or stop a counting window, the duration of every window must always equal an integral number of FM zero-axis crossings and therefore no window ever begins or ends at some unknown time between zero-axis crossings. However, the window duration is not constant, but equals in each case 497 M sec, plus a delta-time increment commencing with the window STOP signal and terminating upon the occurrence of the next (final) data pulse. The clock pulse counter also continues counting until that (final) data pulse occurs, and therefore its count represents the total actual duration of that window. Of course, a one-pulse ambiguity often occurs in the clock pulse counter, but its magnitude is one part in about two million, and therefore does not appreciably affect the conversion resolution. The data counter and the clock pulse counter in each pair both start and stop counting at the same instants, but the data pulse counter always counts an integral number of data pulses with no fractional count ambiguity. The counts from both the data counter and the clock pulse counter are then loaded into the calculator when the next sampling interrogation occurs, and a digital representation is calculated which is proportional to the number of data pulses counted during the window modified by the actual duration of the counting window. It is also possible to use separate clock counters wherein one counter counts the 497 M sec worth of pulses, and then a separate counter is enabled to count the clock pulses occurring during the delta-time increment beginning with the window STOP signal and ending with the next (final) data pulse to be counted. The calculator can then be supplied only with the number of pulses occurring during the delta-time interval, since the clock count occurring during the main 497 M sec portion of the window is a constant that can be easily pre-entered into the calculator means. Using 50 KHz as the FM center frequency, a variation of about 25% can be had over the motion range of the transducer diaphragm so that the FM signal will vary nominally between 38 KHz and 62KHz and the output count of the data counter will vary between about 19 and 31 thousand counts. The variation in window length will not vary more than about 27 microseconds, i.e., at 38 KHz, which means that the maximum number of time clock pulses counted during the delta-time increment of a window will not exceed about 108 pulses at the 4 MHz clock rate.

It is still another important object of this invention to provide an FM to digital conversion discriminator which has a substantial advantage over the prior art detecting analog filtering and A/D conversion means in three important areas: first, in providing better conversion resolution, second, in saving on the initial cost of component parts, and third, in providing a circuit that is essentially binary and is therefore far less sensitive to environmental conditions such as temperature and humidity. The latter advantage is important, in view of the fact that the present discriminator is located usually in the field at the output site of the measuring transducer and therefore has only minimal protection from ambient conditions existing thereat.

THE DRAWINGS

Figure 2:
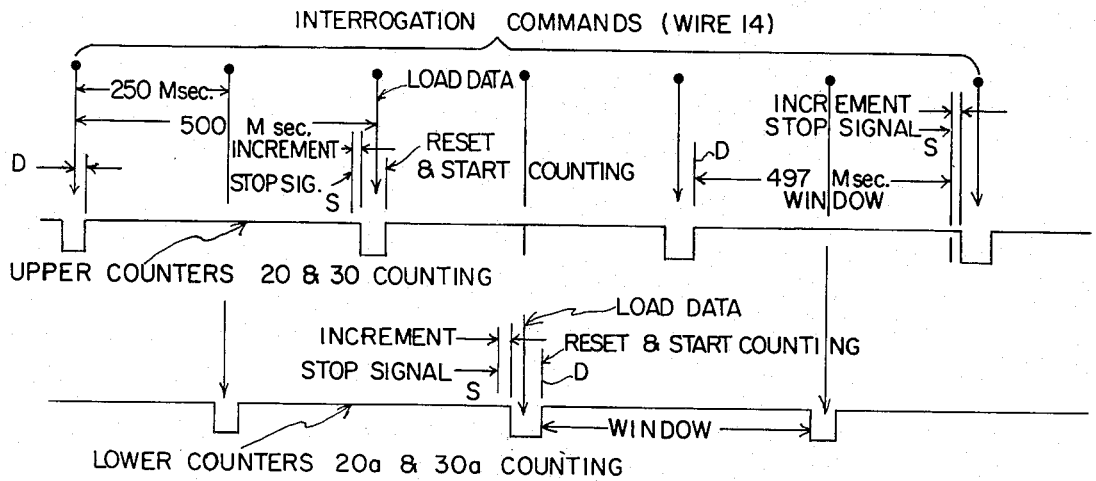
Figure 3:
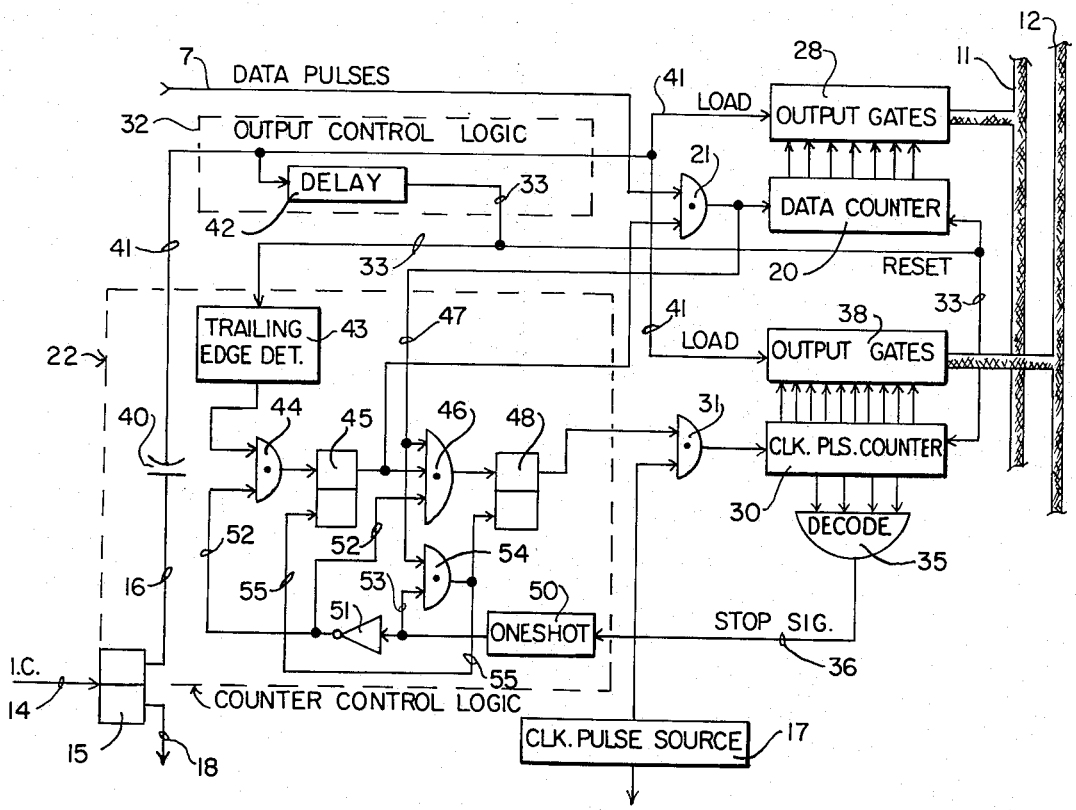

FIG. 1 is a block diagram showing an illustrative embodiment of a discriminator according to the present invention and having two paired sets of counters operating in staggered overlapping real time cycles, the discriminator being coupled to a measuring transducer and being periodically interrogated by calculator means which is operative to calculate the value of the parameter being measured;

FIG. 2 is a diagram showing the periodic interrogations by the calculator means in real-time relationship to the counting and reset sequences of the two sets of paired counters; and FIG. 3 is a schematic diagram showing exemplary counting and output control logic of a type suitable to control the counting, output gating and resetting of paired data and clock pulse counters in one typical set of counters.

Referring now to the drawings, and particularly to FIG. 1, input data to the discriminator shown therein is illustrated as being initiated by a diaphragm transducer 1 linked to move capacitive plates 2 which modulate the frequency of a 50KHz oscillator 3 in accordance with the position of the diaphragm, in a manner well known per se. The diaphragm transducer 1 and plates 2 are a purchased item and form no part of the present invention, being merely illustrative of one of many different types of measuring transducers capable of providing FM data output to the discriminator. The output of the oscillator 3 according to the illustrative embodiment already mentioned above is a 50KHz center frequency, modulated in frequency between about 38 and 62 KHz limits. This frequency is delivered to a shaping network 4 which puts out squared data pulses each representing a zero-axis crossing of the oscillator waveform. Basically, the function of the discriminator circuit is to count the data pulses appearing on the wire 7 over an interval of time to detect oscillator frequency shifts attributable to changes in position of the transducer diaphragm.

Calculator means 10 either hard-wired or programmed to perform the calculations discussed below includes incoming busses 11 and 12. The discriminator shown in FIG. 1 comprises one of many outpost data terminals connectible to these busses, and the calculator 10 interrogates such terminals one at a time through a multiplexer 13 which delivers Interrogation Commands thereto. The Interrogation Commands to the illustrated discriminator appears on wire 14 and take the form of a command pulse appearing every 250 milliseconds. In response to each such command the discriminator shown in FIG. 1 delivers binary output data to the calculator via the busses 11 and 12.

The portion of FIG. 1 comprising the discriminator includes counters, clock pulse source, and control and gating logic by which FM data input is converted to binary output to the busses. The illustrated discriminator actually comprises two (upper and lower) substantially identical circuits each operating on its own one-half second data acquisition counting cycle, the two counting cycles being staggered such that they half overlap each other. Since as stated above, the calculator 10 delivers an Interrogation Command every one-fourth second, the outputs of these two circuits are delivered alternately in the manner to be presently described. Each of the two identical circuits has its own set of counters, the upper circuit including a data pulse counter 20 and a clock pulse counter 30. The input data pulses from line 7 are applied via an AND gate 21, when it is enabled by the counter control logic circuit 22, to the data counter 20 which accumulates data pulses until the enabling signal from the counter control logic 22 to the data gate 21 is removed. Likewise, the clock pulse counter 30 is counted upwardly by clock pulses from the 4 MHz clock pulse source 17 entering through the AND gate 31 so long as it is enabled by output from the counter control logic circuit 22.

Since the over-all interval during which pulses could be accumulated in either of the counters 20 or 30 is 500 M sec, the counting will be stopped just before this maximum interval has run. For this purpose, a decoder gate circuit 35 is wired to the clock pulse counter 30 such that this gate outputs after the counter 30 has counted pulses for 497 M sec. This output appears on wire 36 and is referred to as a STOP signal. As will be described in detail in connection with FIG. 3, this STOP signal combines with the next data pulse to counter 20 to stop both counters 20 and 30 from counting. Output gates 28 and 38 are then actuated by the output logic control circuit 32 to deliver their accumulated counts respectively to the input busses 11 and 12 of the calculator, which then performs the calculations which are discussed hereinbelow. When the binary data has been output from the counters 20 and 30 to the busses 11 and 12, the counters are then reset by a reset output appearing on wire 33.

The lower portion of the discriminator circuitry shown in FIG. 1 is identical to the upper portion and is labelled with similar reference characters having the suffix $a$ added, i.e., the data counter in the lower set of counters is labelled 20$a$ and the clock counter in the lower counter pair is labelled 30$a$, etc.

As mentioned above in the objects of the invention, in order to achieve excellent resolution while converting from FM data to digital representations whose magnitudes faithfully follow changes in the output frequency of the oscillator 3, the exact duration of the real-time window during which pulses are counted by either set of paired counters is allowed to vary somewhat so that the counting window begins and ends at the exact moment of arrival of a data pulse on wire 7, i.e., not sometime between pulse arrivals. This is done by starting the 4 MHz clock counter 30, or 30$a$, at the moment of occurrence of a data pulse passing through data gate 21, or 21$a$. Likewise, the 4 MHz clock counter is stopped after 497 M sec of the counting window has transpired, but not until the next data pulse passes through data gate 21 or 21$a$, whereby a delta-time increment of as many as about 108 of the 4 MHz pulses can be added to complete the pulse counting window.

The diagram of FIG. 2 shows the succession of events in both paired sets of counters versus the real-time occurrences of the Interrogation Commands sent out on wire 14 every 250 M sec by the calculator means 10. Below the representations of the Interrogation Commands there are two timing diagrams, the upper one representing the real time duration of typical counting by the upper set of counters 20 and 30 and the lower one representing the real-time duration of typical counting by the lower set of counters 20$a$ and 30$a$. The beginnings and endings of the counting cycle series of the upper and lower sets are staggered so that each set is controlled by different alternate pulses of the Interrogation Commands. Each set of counters stops counting just before the next Interrogation Command to which it is sensitive and its count is loaded into the calculator means 10 during that command. That set of counters is then reset and started counting again immediately after that command. The increment by which its counting interval is lengthened between the occurrence of a STOP signal and the occurrence of the next and final data pulse to be counted is very brief, and its illustration in FIG. 2 is greatly exaggerated for the sake of clarity in the drawing.

FIG. 3 shows exemplary counting and output control logic suitable for controlling the counting cycle of one set of counters and the loading of the count into the calculator busses 11 and 12 in response to an Interrogation Command from the calculator means. FIG. 3 shows only the upper set of counters and their control means, although the clock pulse source 17 and the flipflop 15 are common to both sets of counters. The flipflop 15 is toggled to its opposite state of conductivity every 250 M sec by an Interrogation Command on wire 14. When the wire 16 goes high in response to one such Command the upper set of counters 20 and 30 has its count loaded into the busses 11 and 12, is reset and then started counting again. Conversely, when the wire 18 goes high, the lower set of counters 20$a$ and 30$a$ has its count loaded into the busses 11 and 12, is reset and then started counting again. Thus, at the time when one set of counters is through counting, the other set is about half through its counting cycle.

Assuming that the lower set of counters is about halfway through its count, when the Interrogation Command in the upper lefthand corner of FIG. 2 arrives the flipflop 15 will toggle to make the wire 16 go high, and a pulse will pass through the capacitor 40 onto the LOAD wire 41 to enable the output gates 28 and 38 to deliver the counts of the counters 20 and 30 to the respective busses 11 and 12, and thence to the calculator means 10 which has just issued the Command. The wire 41 also initiates the Delay circuit 42 which after a brief delay, D in FIG. 2, actuates the line 33 to reset both counters 20 and 30. The pulse on wire 33 has its trailing edge detected by the circuit 43 which delivers a pulse to the gate 44 to start the next counting cycle of the counters 20 and 30 in the following manner.

At the beginning of the next counting cycle the one-shot 50 has no output, and therefore the inverter 51 makes the wire 52 high, enabling the lower inputs to the AND gates 44 and 46. As a result, the output from the trailing edge detector 43 passes through the gate 44 and sets the flipflop 45, thereby enabling one input to the Data gate 21 and a second input to the AND gate 46. Since the data gate 21 is enabled, the next data pulse from the transducer appearing on wire 7 is counted into the reset data counter 20, and it also starts the clock pulse counter 30 counting as follows:

The first data pulse through the data gate 21 appears on wire 47, and since the other two inputs to the gate 46 are currently enabled as related above, it passes through the gate 46 and sets the flipflop 48, thereby enabling the clock pulse gate 31 to pass clock pulses to the counter 30. Both counters 20 and 30 thus start counting on the first data pulse, virtually simultaneously, and they continue counting for almost one half of a second. Near the end of this interval the decoder 35 decodes a count at 497 M sec for which they are hard wired and issues a STOP Signal pulse S on wire 36. This signal actuates the one-shot 50 which puts out a pulse whose duration lasts from the time of the STOP Signal on wire 36 until a time not exceeding the longest time before the next data pulse zero-axis crossing, i.e., no more than the period of one data pulse. During this output of the one-shot 50 the wire 52 is low but the wire 53 is high and therefore the AND gate 54 is enabled. Therefore, when the next data pulse appears on wire 47, it passes through the gate 54 and immediately resets the flipflops 45 and 48, thereby disabling the data gate 21 and the clock pulse gate 31 and stopping the counters 20 and 30. They remain stopped, retaining their counts, until a subsequent Interrogation Command signal on wire 14 again toggles the flipflop 15 and makes the wire 16 go high again to start the upper counting cycle again as related above. Note that when the upper counters 20 and 30 were about half-counted up, an Interrogation Command occurred which recycled the lower counters 20a and 30a at the time of occurrence of the second Interrogation Command (from the left appearing in FIG. 2). The wire 18 goes to circuitry which controls the lower counters 20a and 30a and is identical to that shown in FIG. 3.

Therefore, data is delivered every 250 M sec to the busses 11 and 12 alternately from the upper counter set and then from the lower counter set, each time under the Interrogation Command of the calculator means 10 which is programmed or wired to perform calculations as follows. The transducer 1, capacity 2 and oscillator 3 are designed such that within the useful displacement range of the diaphragm in the transducer 1 the variation in oscillator frequency is linear. For purposes of illustrating the present discriminator this assumption is made.

It follows then that the relationship can be expressed in terms of a ratio of conversion voltages such that $$\frac{E_{out}}{E_{ref}} = \frac{f_d}{f_o}$$

where $E_{out}$ is the converted output voltage of the discriminator, $E_{ref}$ is a reference voltage level selected to give the desired range of output voltages for full-scale frequency deviation of the oscillator with diaphragm deflection, $f_i$ is the present oscillator frequency, and $f_o$ is the oscillator center frequency. However, the frequencies in the present case are represented by counts $C_d$ of the data counters 20 and 20a, modified by the length of the counting window which comprises a fixed window count $C_w$ plus a delta-time incremental count $C_\Delta$ added thereto, which latter count is a variable. As a result, the frequency $f$ can be expressed as $$f \sim \frac{C_w \cdot C_d}{C_w + C_\Delta}$$

which merely scales the actual data count $C_d$ down to the equivalent count for a window of fixed duration. Obviously, $f_o$ can be expressed as a constant $C_k$ for the fixed duration window and therefore $$E_{out} = \frac{E_{ref}}{C_k} \left[ \frac{C_w \cdot C_d}{C_w + C_\Delta} \right]$$

in which $E_{ref}/C_k$ can be replaced by a constant $K$ which is set into the calculator and manually adjustable to make the system easy to calibrate. Therefore, the digital output of the calculator can be expressed as a voltage whose magnitude is proportional to the frequency of the oscillator 3 and this voltage is then calculated once every 250 M sec, alternately using the count loaded into the calculator 10 from the upper set of counters, and subsequently the count loaded into the calculator 10 from the lower set of counters. The expression repeatedly solved by the calculator 10 is $$E_{out} = K \left[ \frac{C_w \cdot C_d}{C_w + C_\Delta} \right]$$

Moreover since $C_w$ is a known constant count, it becomes attractive to use a separate smaller increment counter in the circuit which begins counting when the STOP Signal S appears on wire 36 and continues counting until the flipflops 45 and 48 are reset by output from gate 54. This smaller increment counter accumulates only the count $C_\Delta$. If the constant count for $C_w$ were combined into the constant $K$, then a simpler equation could be solved by the calculator 10 in which there are only two variables, namely the count $C_d$ in the data counter 20 and the count $C_\Delta$ in the smaller increment counter. Of course, the increment count $C_\Delta$ can be obtained from the over-all counter 30 or 30a merely by loading into the calculator 10 only the lower-order bits which actually do vary as a result of the incremental count $C_\Delta$.

The present invention is not to be limited to the exact embodiment shown in the drawings, for obviously changes may be made within the scope of the following claims.

We claim:
1. A discriminator system for converting a frequency modulated (FM) signal whose frequency represents recoverable intelligence into a magnitude representation whose resolution exceeds the resolution obtainable merely by counting cycles of the FM signal over a fixed time interval, comprising:
   a. means for receiving said FM signal and delivering data pulses representing its cycles;

b. a source of clock pulses delivering pulses at higher frequency than said FM signal;

c. data counter means operative when actuated to count said data pulses;

d. clock counter means operative when actuated to count said clock pulses, and having decoder means operative to deliver a STOP signal when the clock counter means has counted a certain number of said clock pulses representing a counting window of fixed duration;

e. control circuitry establishing repeating data acquisition cycles each including one of said windows, the control circuitry being operative upon occurrence of a data pulse at the beginning of a cycle to enable both counter means to commence a counting window, and the control circuitry being operative upon the occurrence of said STOP signal to await the occurrence of the next data pulse and thereupon to terminate the counting of both counter means; and f. calculator means responsive to the number of data pulses counted and to the number of clock pulses counted in the same cycle to calculate said converted representation whose magnitude is proportional to the number of data pulses counted but corrected by a factor relating the number of clock pulses counted within the window and the number of clock pulses incrementally counted between the occurrence of the STOP signal and the subsequent occurrence of the next data pulse, said calculator means including means operative after each counting cycle to calculate said representation by multiplying a constant times the count in the data counter means scaled by said factor which comprises the ratio of the count in the clock pulse counter means upon the occurrence of the STOP signal divided by the latter count plus the clock pulse count incrementally counted between the occurrence of the STOP signal and the subsequent occurrence of said next data pulse.

2. The system as set forth in claim 1, wherein said control circuitry includes logic means operative after said termination of the counting to load the counts from said counter means into said calculator means and to reset said counter means.

3. The system as set forth in claim 1, including means controlling the applying of data pulses to the data counter means and further including gate means controlling the applying of clock pulses to the clock counter means, and said control circuitry controlling the actuation and termination of counting in said counter means by controlling said gate means.

4. The system as set forth in claim 1, wherein for the purpose of further improving the resolution of said conversion of the FM signal to a magnitude representation the pulses are counted in real time acquisition cycles which are longer than the time intervals between calculations by said calculator means, said system further comprising means in the control circuitry for establishing multiple separate series of repeating data acquisition cycles which series are staggered in real time and mutually overlap, and said counter means including for each of said separate series of cycles paired data and clock counters; and said system including output control logic for sequentially coupling said paired counters for each terminating acquisition cycle to said calculator means.

5. The system as set forth in claim 4, wherein the calculator means has means to deliver an interrogation command at the beginning of each of its calculation intervals, and said control circuitry comprising separate output control logic for each set of counters and separate counter control logic for each set of counters, and the control circuitry including means to select a different set of counters and control logic in response to each successive interrogation command, the selected output control logic being operative to load the counts of its paired counters into the calculator means and reset the counters, and the selected counter control logic being operative to actuate the reset counters to commence counting again.

* * * * *